(12) United States Patent
Meadows et al.

(10) Patent No.: US 12,393,568 B1
(45) Date of Patent: Aug. 19, 2025

(54) SYSTEM AND METHOD FOR AUTOMATING CHANGE MANAGEMENT TASKS

(71) Applicants: Anna Meadows, The Colony, TX (US); Taylor Meadows, The Colony, TX (US)

(72) Inventors: Anna Meadows, The Colony, TX (US); Taylor Meadows, The Colony, TX (US)

( * ) Notice: Subject to any disclaimer, the term of this patent is extended or adjusted under 35 U.S.C. 154(b) by 193 days.

(21) Appl. No.: 18/227,971

(22) Filed: Jul. 30, 2023

Related U.S. Application Data

(60) Provisional application No. 63/427,630, filed on Nov. 23, 2022.

(51) Int. Cl.
| | | |
|---|---|---|
| *G06F 21/54* | (2013.01) |
| *G06F 8/71* | (2018.01) |
| *G06F 11/36* | (2025.01) |
| *G06F 16/23* | (2019.01) |
| *G06F 21/31* | (2013.01) |
| *G06F 21/55* | (2013.01) |
| *G06F 21/62* | (2013.01) |

(52) U.S. Cl.
CPC ............ *G06F 16/2358* (2019.01); *G06F 8/71* (2013.01); *G06F 16/2329* (2019.01); *G06F 16/2343* (2019.01); *G06F 21/6218* (2013.01)

(58) Field of Classification Search
CPC ............ G06F 16/2358; G06F 16/2329; G06F 16/2343; G06F 21/6218; G06F 8/71
See application file for complete search history.

(56) References Cited

U.S. PATENT DOCUMENTS

| | | | |
|---|---|---|---|
| 2005/0125794 A1* | 6/2005 | de Groot | G06F 8/71 718/100 |
| 2022/0197783 A1* | 6/2022 | Patten, Jr. | G06F 9/44526 |
| 2024/0078172 A1* | 3/2024 | Duggal | G06F 11/3696 |

OTHER PUBLICATIONS

Sami Kaukavuori, Requirements Management in the Software Development Process , Aug. 30, 2000, [Retrieved on Mar. 27, 2025]. Retrieved from the internet: <URL: https://lutpub.lut.fi/bitstream/handle/10024/34463/samikauk.pdf?sequence=1> 107 Pages (1-107) (Year: 2000).*

Muhammad Azeem Akbar et al., AZ-Model of software requirements change management in global software development, 2018 IEEE, [Retrieved on Mar. 27, 2025]. Retrieved from the internet: <URL: https://ieeexplore.ieee.org/stamp/stamp.jsp?tp=&arnumber=8610964> 6 Pages (1-6) (Year: 2018).*

* cited by examiner

*Primary Examiner* — Anibal Rivera
(74) *Attorney, Agent, or Firm* — Richard Eldredge; Leavitt Eldredge Law Firm

(57) ABSTRACT

A change management task automation system reduces manual effort required for change audits and streamlines the change management process, enforcing preventative compliance with change management best practices. A plurality of automation modules provides change management task automation functionality for several processes, including software change management, database change management, key report change management, data lake change management, patch change management, and controlled version document repository management automation.

19 Claims, 15 Drawing Sheets

DBCM Flow (Embodiment 1)

SYSTEM AND METHOD FOR AUTOMATING CHANGE MANAGEMENT TASKS

BACKGROUND

1. Field of the Invention

The present invention relates generally to change management systems, and more specifically to a system for automation of change management tasks.

2. Description of Related Art

Change management systems are well known in the art. However, in the current audit environment, there is a distinct lack of automation and technical innovation, resulting in more manual effort being expended than necessary to complete the required audits, such as System and Organization Controls (SOC) 1 and 2 Type 2 audits, Sarbanes-Oxley (SOX) audits, and International Organization for Standardization (ISO) audits. Such audits typically require extensive change management testing, which can be easily automated. Automation of such testing would reduce the need for testing of hundreds of samples to just a single sample.

The present invention seeks to bring new automation and security to software change management auditing and compliance. In current practices, which may be characterized as a detective approach, change management is done by manually gathering and testing sample selections based on the population of changes made in a time frame. Changes are monitored, identified, and reported on after they have already occurred. While current tools are effective in logging and notifying about changes, they often don't provide sufficient context or preventative capabilities, leaving auditors with significant manual work to understand the implications of these changes.

Considering software development as a use case, drawbacks to the detective approach include the risk of unauthorized changes, risk of untested code, low quality code causing production issues, risk of malicious code injection through lack of segregation of duties, the expense of large testing sample sizes, and general failure to truly prevent unauthorized changes. More generally, shortcomings of current change management systems include limited proactive measures, lack of integration, and limited automation.

By contrast, the present invention seeks to take a preventative and proactive enforcement approach to change management.

The present invention is intended to support auditors in their tasks, instead of adding to their workload creating a new segment of automation for this use case. The present invention will benefit any organization that either develops code, manages a database, uses key reports, manages user access, manages sensitive documents, and/or is subject to needing certain audits performed such as SOC 2 Type 2, SOX, ISO-27001, FedRAMP reporting. Based on current estimations, organizations that choose to leverage the present invention's tooling suite will see a reduction in effort and cost for the obtainment of their various audits through the ability to do a test of one. When a system is automated, rather than testing thousands of change samples, an audit firm may simply test a sample of one change and if that one passes, then all changes will pass.

Accordingly, although great strides have been made in the area of change management systems, many shortcomings remain. It is therefore an objective of the present invention to provide a system for automating change management tasks using a proactive and preventative approach, thereby resulting in reduced cost of audit fees and allowing for expedited time to completion and reduced staffing required for audits, as well as reducing the allocation drain on internal audit staff and minimizing the risk of human error, among other benefits.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
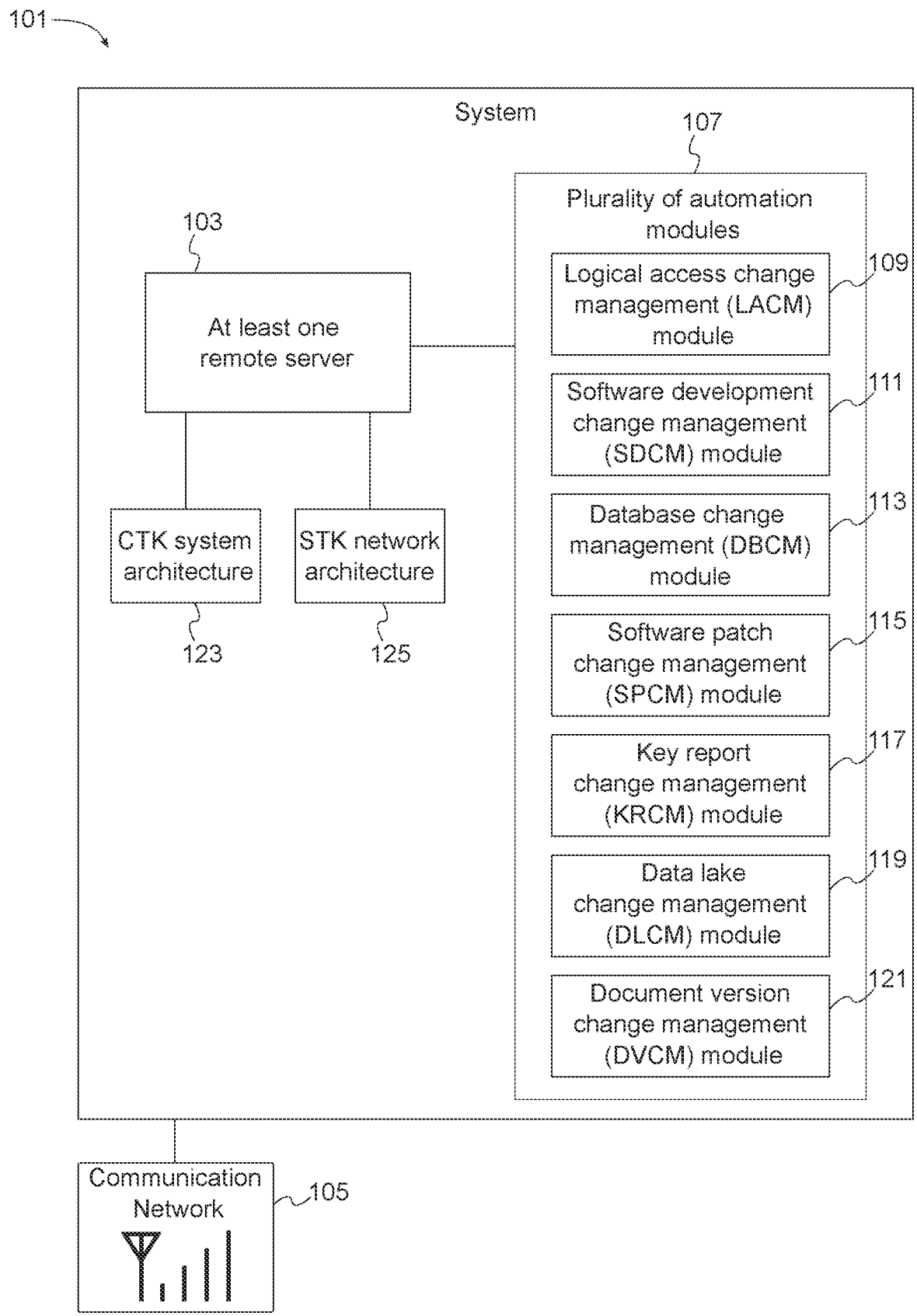
FIG. 1 is an overview diagram of the system for automating change management tasks in accordance with a preferred embodiment of the present invention.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional change management systems. Specifically, the system of the present invention automates various change management tasks, resulting in decreased audit fees, staffing requirements, and completion time for audits. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIGS. 1-9 depict several diagrams and process flow of a change management task automation system 101 in accordance with a preferred embodiment of the present application. It will be appreciated that the change management task automation system 101 overcomes one or more of the above-listed problems commonly associated with conventional change management technologies. In addition, it should be appreciated that more or fewer of such components may be included in different embodiments of the change management task automation system 101.

In some embodiments, the present invention may be referred to by the name "Change Captain". The present invention enforces compliance with best practice change management processes across various types of entities over which to digitally manage change control. By automating certain processes, the present invention reduces staffing requirements to complete repeatable, mundane tasks in the change management space, allowing for expedited time to completion of audits and reducing the allocation drain on internal audit staff, as well as ensuring quality of changes made.

Referring to FIG. 1, it is contemplated and will be appreciated that system 101 can incorporate at least one remote server 103 communicably coupled with a communication network 105 such as the Internet. The at least one remote server 103 may be understood to represent any collection of servers, computing devices, networking components, and any other electronic components necessary to implement the present invention according to its spirit and scope disclosed herein.

The at least one remote server 103 manages a plurality of automation modules 107. Each of the automation modules 107 ensures various types of computer-implemented changes follow a standardized preventative change management process.

In the contemplated embodiment, the plurality of automation modules 107 comprises, but is not limited to:

a logical access change management (LACM) module 109, configured to automate provisioning and validation of user access permissions;
 a software development life cycle change management (SDCM) module 111, configured to automate development and testing of changes made to a software system;
 a database change management (DBCM) module 113 configured to automate changes made to a database;
 a software patch change management (SPCM) 115 module configured to automate testing and implementation patches made to third-party software;
 a key report change management (KRCM) module 117 configured to automate version management of key reports;
 a data lake change management (DLCM) module 119 configured to automate change management of data lakes; and
 a (controlled) document version change management (DVCM) module 121 configured to automate document versioning.

It is further contemplated and will be appreciated hereinafter that in addition to the change management automation modules 107, the present invention may incorporate additional features. More particularly, in the contemplated embodiment, a distinguishing feature of the system of the present invention is the implementation of advanced security measures, including, but not limited to:

Secure connection protocols, facilitated either through a virtual private network (VPN), zero trust network access (ZTNA) model, or a combination of both to establish secure communications with client systems;
 A novel system for secure application programming interface (API) key storage and management, which may be alternately referred to as "Collect the Key" or "CTK" 123; and
 A cloud-agnostic secure nested network architecture with zero-trust access using a single virtualized container, ephemeral databases, and specialized intrusion detection, which may be referred to as "Secure the Key" or "STK" 125.

It is further contemplated and will be appreciated that the present invention as a whole, as well as the various automation modules 107 individually and other relevant component systems, in various instances and/or configurations, may seek to provide the functionalities disclosed herein according to a Software-as-a-Service (SaaS) model designed to meet the needs of multiple clients, and may either be self-containing or integrate with existing tools. The present invention is preferably established and maintained by a centralized controlling entity that administrates clients' access to the various functionalities of the present invention, in whole or in part, by integrating clients' systems with the systems of the present invention over the Internet or another applicable electronic communication means.

In the contemplated embodiment, for each change, the change management process includes aspects such as, but not limited to, acquisition of approval prior to the change being implemented, functional integration of segregation of duties, and advanced reporting functionality, such as Capital Expenditure (CapEx) reporting or any other relevant type of reporting.

Figure 2:
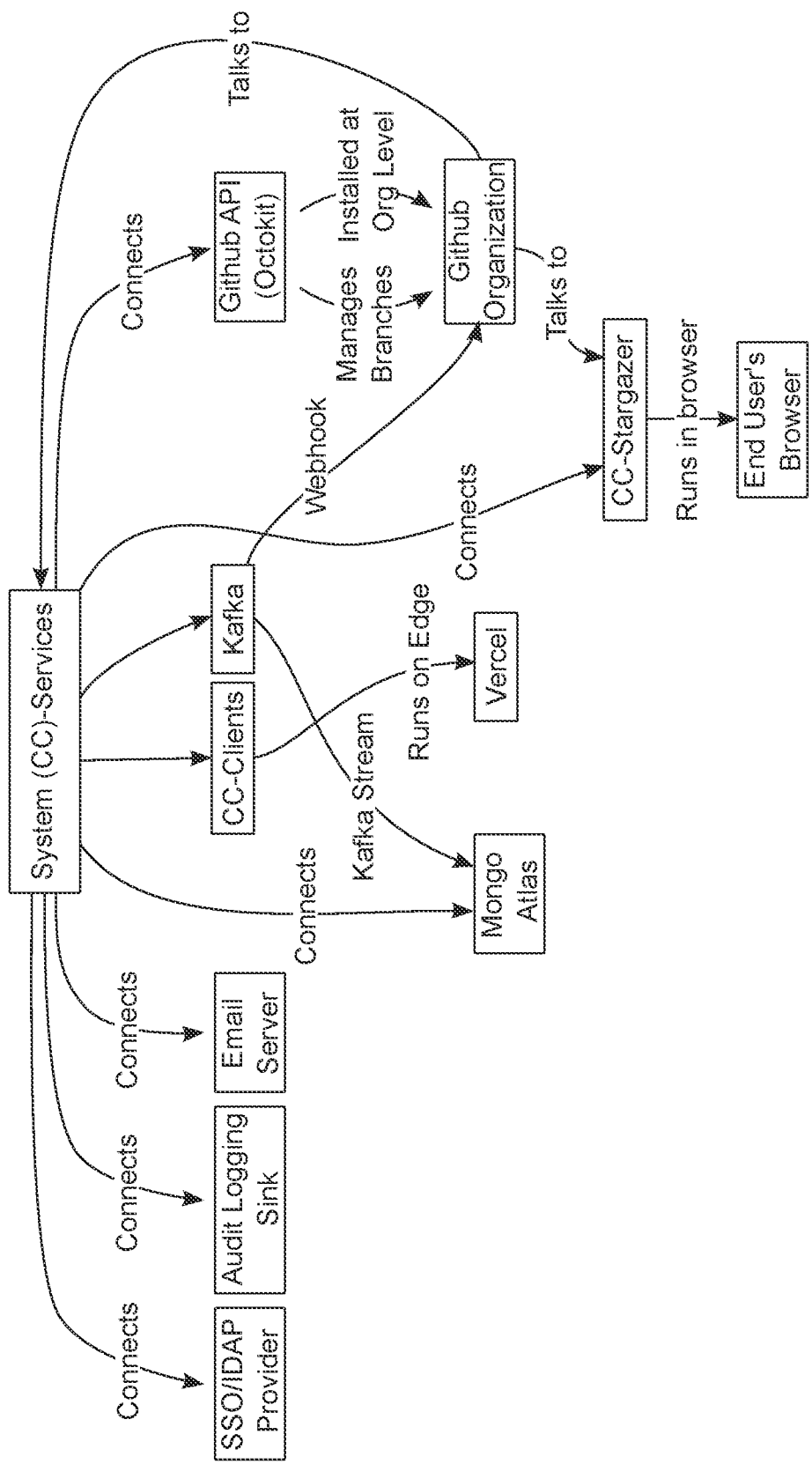
FIG. 2 depicts a system design diagram in an exemplary implementation of the present application.

FIG. 2 depicts a system design diagram in an exemplary embodiment which may be understood herein to apply to the LACM module 109, the SDCM module 111, the DBCM module 113, the SPCM module 115, the KRCM module 117, and the DLCM module 119. The system design diagram of FIG. 2 should be understood to depict various real-world implementation details for implementing the herein described systems of the present invention, and is not intended to be limiting. Various other system design configurations and components may be implemented in various embodiments and instances as desired and suitable to achieve the spirit and scope of the present invention as herein described.

The Logical Access Change Management (LACM) module 109 of the present invention is uniquely designed relative to the feature set of the present invention, being configured in some embodiments to be integrated natively as a permissions module of the broader system, Change Captain, of the present invention. The LACM module 109 is broadly responsible for controlling user access permissions throughout the Change Captain system or any other system with which it is integrated. When modifications are made to user permissions by the LACM module 109, notifications are dispatched to the users to inform them of the change through any suitable means, including web and mobile application notifications, text messages, emails, and the like.

The system further provides an option for batch updates, aggregating notifications based on user-defined preferences. The delivery schedule for these aggregated notifications can be customized by users based on parameters such as time, location (determined from IP address, GPS data, or other relevant and available information), or type of updated content.

Further, monthly or quarterly automated logical access reports may be sent out to the appropriate leaders of each Change Captain product type and projects or departments for outside integrations for logical access reviews to ensure current access permissions roles remain appropriate. The system then stores and aggregates all the responses in an easy dashboard ready for auditor review. The increased granularity of reviewer selection allows for increased value than the present state wherein a generalist typically reviews rather than a local subject matter expert on the team use cases for access.

Preferably, the LACM module 109 uses zero trust security practices, a broad range of application through webhook, API, and authentication mechanisms in its implementation. The LACM module 109 is configured to enforce policies and best practices of least access, ensuring that when access requests are received by the system, only the correctly corresponding access is granted. According to the principle of least access, also known as least privilege, any given entity is granted the minimum resources and authorization the entity needs to perform its function. All access is documented, reviewed, granted, and confirmed through an automated software flow that eliminates the potential for human error and reduces potential risk to clients.

In the contemplated embodiment or in various other embodiments, the LACM module 109 may be implemented as a standalone SaaS product, neutral in application and capable of integrating with other third-party or client platforms to fulfill the same functionalities of logical access management as it provides to the Change Captain system. When configured in this role to integrate with and provision user access permissions for client systems, using the zero-trust network access model to communicate with the client systems, the LACM module 109 is further configured to synchronize user permissions between the LACM module 109 and an active directory (AD) environment of a client system. Thus, if a user is ever disabled in the AD environment, they will also be disabled in the Change Captain system and all tools integrated therewith. This integration allows for automated de-provisioning of access across multiple applications at once while ensuring no access is accidently left enabled after a termination.

In the contemplated embodiment, the LACM module 109 functions on a ticket system basis to ensure traceability of the entire lifecycle of a change. It may be further understood that various other change management modules, processes, and the like of the present invention may similarly operate according to a ticket system in various embodiments, even if not explicitly stated.

Figure 3:
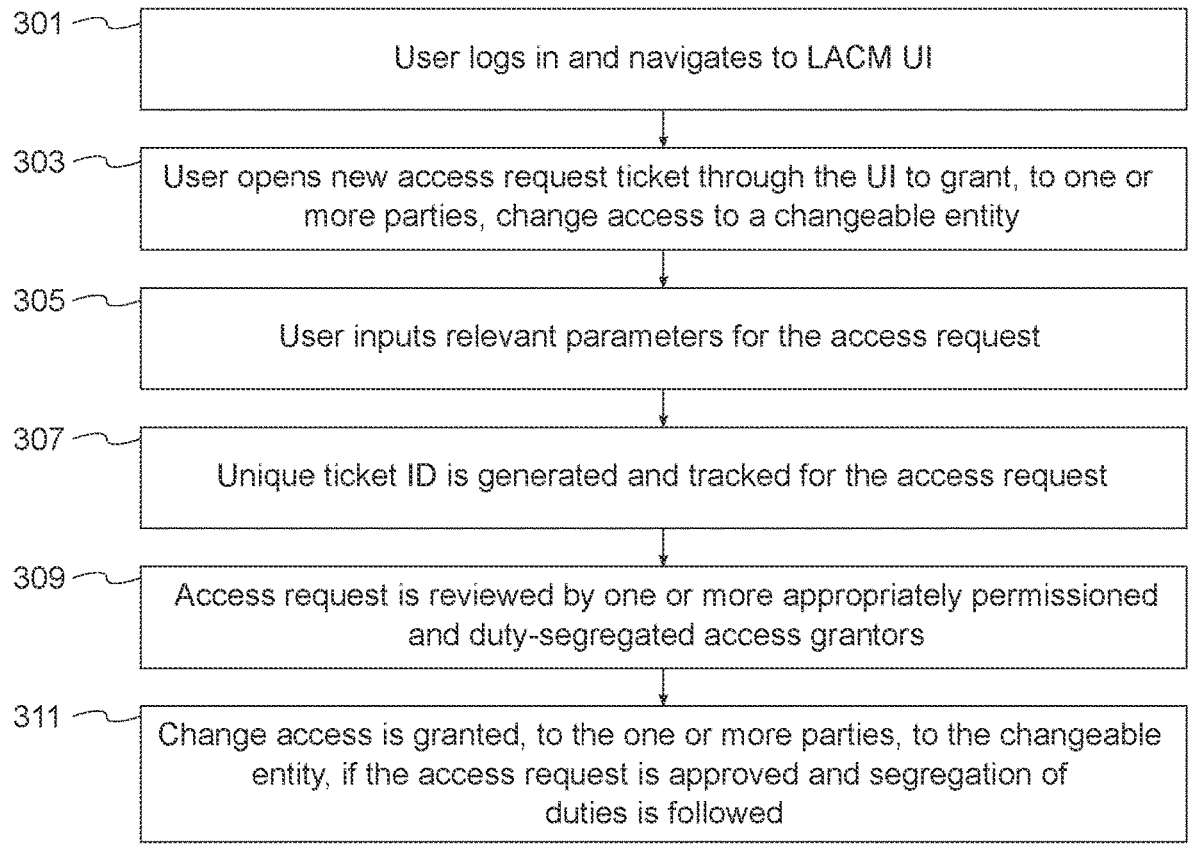
FIG. 3 depicts a process flow for the LACM module in a preferred embodiment of the present application.

To begin a change lifecycle with the LACM module 109, as depicted in FIG. 3, a user logged in to the system with appropriate user credentials navigates 301 to a user interface (UI) provided for the LACM module, such as a landing page in a web browser, and interacts through the UI to open a new access request ticket 303 which is formed in the system upon submission of the request by the user. The requesting user may customize various aspects of the access request 305, such as choosing whether to request change access for themselves, another person, a set of people, or various other types of parties across any combination of permissions and products. The requesting user may also be provided the option through the UI to choose how to modify permissions for the chosen parties, such as creation, removal, relative increase or decrease of permissions, and the like. A unique ticket ID is generated in the system of the present invention for the access request 307 (or requests). The access request may be tracked over its change lifecycle in the system of the present invention through its unique ticket ID.

After an access request is created, it is reviewed for approval 309. Only accounts with appropriate permissions may act as access grantors to review and approve access requests. Access grantors may exist in various permutations as relevant to the access request. Requests belonging to certain categories may require review and approval by specific number of access grantors, for example. Other influencing factors may include organizational scale, staffing, client company policies, and types of audits seeking to be supported, though it is contemplated that many factors may influence the scope of the request and the aforementioned factors should not be considered limiting. Further, access requests may have stages, increments, or other subdivisions which may each vary from each other, be dependent on each other, or may be otherwise interrelated or discrete depending on the type of request and other factors.

In the contemplated embodiment, the LACM module 109 is configured to receive an access request to grant, to one of more parties, change access to a changeable entity managed by the LACM, wherein the changeable entity may be any type of relevant file, software patch, document, database, or other entity for which it may be desirable to manage change of using the present invention. As previously described, the LACM module 109 creates a new access request ticket based on the request, wherein the access ticket request is required to be reviewed and approved by one or more access grantors. An access grantor is not necessarily defined by any other attributes other than having review and approval permissions and conforming to segregation of duties with respect to the user who submitted the access request—for example, even if the access requester has appropriate review and approval permissions, they may not approve their own change. The LACM module 109 grants, to the one or more parties, change access to the changeable entity 311, if approval of the access request is received from the one or more access grantors such that the requirement of segregation of duties is followed. Across all change management modules of the present invention, segregation of duties should be enforced at all times, whether for use with external integrations or as a module to support Change Captain functionality.

Software change management is needed to protect any code that ultimately goes to production, including new feature works, bug fixes, hot fixes, and patches. The software development change management (SDCM) module of the present invention ensures and enforces compliance to best practice SDCM through enforced and automated flows, ensuring that each step of the SDCM process is completed and in the correct order before code is queued for production.

As a result of the present invention's enforcement of the SDCM process, internal and external auditors are allowed to perform automated testing around the SDCM process, thereby allowing a passing audit via testing of a sample of one rather than hundreds as is current practice. Since every change must follow the same change process, if SDCM controls pass for one change (in deployment, for example), an auditor can confidently say the test will pass for all changes.

Figure 4:
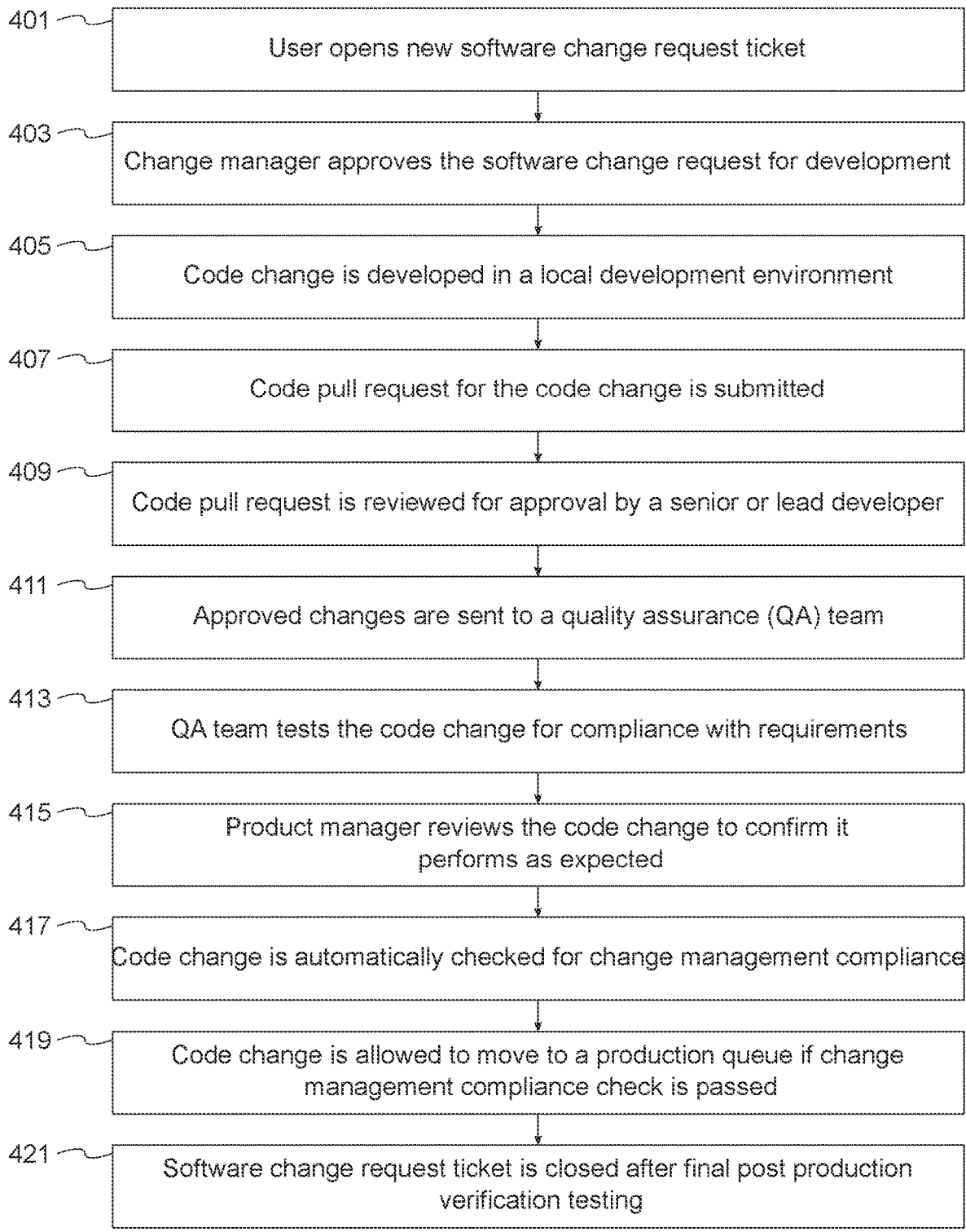
FIG. 4 depicts a process flow for the SDCM module in a preferred embodiment of the present application.

The following is a general software change process flow contemplated in the present invention using the SDCM module 111, as depicted in FIG. 4. It should be noted that the following is a generally recommended flow in some embodiments, but some steps may be omitted or otherwise changed as desired in other embodiments. It should be understood that while several of the following steps describe actions taken by personnel, the steps are implemented through interaction with the SDCM module 111 software, which provides the necessary tools and automation to facilitate the various functionalities.

First, a request ticket is opened for a software change 401, and a change manager then approves the software change request for development 403. Next, a code change is developed in a local development environment 405, and a code pull request for the code change is submitted 407 to the system. The code pull request is reviewed by a senior or lead developer 409, who approves or denies the merge, and approved changes are sent to a Quality Assurance (QA) team 411. The QA team tests the reviewed code change before approving to ensure it meets requirements 413. A product manager reviews the code change and confirms its features fit the original request and work as expected before allowing the move of the change to production 415. The SDCM module 111 automatically checks the code change for change management compliance 417; more particularly, that the code change went through the aforementioned change management process properly, receiving all necessary approvals from relevant entities, such as the QA team and the product manager. The SDCM module 111 then allows the move of the code change to a production queue, if the code change passes the change management compliance check 419. Finally, the software change request ticket is closed after final post production verification testing 421.

This process, enhanced through the automation of the present invention, ensures that: every software development change follows the same change management flow, segregation of duties exists for all development changes, testing is performed before code is allowed to move to production, appropriate approvals are obtained before a change can progress in the development flow, and post production verification (PPV) is completed before a development change can be marked complete. Moreover, the SDCM module 111 of the present invention helps reduce the risk of bad code being pushed into production, including by lowering the risk of bad actors intervening somewhere in the process.

Acting as a SaaS, through integration with code repositories, the SDCM module 111 of the present invention blocks each user's ability to integrate a code change into a predefined branch without certain prerequisites in place which align with best practices. These prerequisites include, but are not limited to, requirements of: approval before a change is made, approval by one or more appropriate parties, segregation of duties, principle of least access, testing of code pre-production, and post-production validation.

Further, in the contemplated embodiment, the SDCM module 111 is configured to implement one or more phase gates based on compliance factors in a software production pipeline, wherein the SDCM module 111 blocks merging of the code change into a production branch of the pipeline until each of a plurality of development prerequisites are satisfied, and wherein the prerequisites correspond to the compliance factors.

Prior to a code change being capable of being merged into the production branch, further preventative enforcement takes place when gated against various pre-requisites including, but not limited to, individual organization policy preferences around testing, number of PR approvers, branches identified as managed by the Change Captain system. All branches pertaining to production or sensitive data must be identified in advance of implementation.

Further, the SDCM module 111 includes at least one integration tool configured to, during routine use by technical team members, minimize context switching and enable, outside the context of the SDCM module 111, collection of information necessary to ensure compliance. The at least one integration tool may comprise a browser extension intended for use outside of the context strictly of the SDCM product, allowing a broader application of use. The browser extension may be paired with a code repository plug-in or other relevant means to allow users to interface with the SDCM functions such as, but not limited to, creating, selecting, assigning, promoting, or linking any new, existing, or in-progress SDCM tickets to a new or existing code request ID. This allows real-time audit traceability without requiring significant effort on behalf of the client, maximizing efficiency through reduction in context switching between development, testing, design, and other types of tasks relevant to reviewing tickets, without the traditional use requirement of a user logging in to a web app to perform a function each time.

In the contemplated embodiment, the at least one integration tool may further comprise a plug-in configured to function in a local development environment outside of a web browser or application. The plug-in, when connected to the Internet by an API or Remote Procedure Call (RPC) can interact with the present invention's system backend for access to core functions for advancing audit requirements of traceability while further minimizing context switching.

Furthermore, the two-way communication between Change Captain and the applicable code repository allows for granular, automatic updates including time stamps of work, time in a state that is tracked accurately as possible based on the requirement of a user approving each promotion of state thereby allowing for granular, and accurate, reporting such as capital expenditure and operational expenditure reporting amongst others that are standard software organization key performance indicators, objectives and key results, and agile metrics.

The SDCM module 111 is applicable not only to software and application development, but for schema database changes as well. The SDCM module 111 ensures that all modifications to schema database changes are submitted through a code pull request, where they are reviewed and approved by an appropriate individual before being merged to the main branch for production deployment. During this process, the SDCM module 111 ensures segregation of duties are followed and that post-production testing and approval occur before the database schema change ticket can be closed.

The SDCM module 111 is novel in its integration mechanism when being implemented through the requirement of an API Key rather than the need for credentials for users. Upon implementation, SDLC can lock branches on one or more projects or repositories depending on client configuration.

The SDCM module 111 facilitates integration of previously unrelated systems, enabling, automation, logging, and activation of proactive prevention measures based on automated tracking and analysis of native events from one or more systems managed by the SDCM module 111. The proactive prevention measures may be based on seemingly unrelated events and may be generated by disparate independent systems without relying on a common event.

The SDCM module 111 further integrates with the LACM module 109 to validate whether users can perform specific functions and appropriately block or approve the function, regardless of whether the user has the permissions in the code repository. For example, a user might be an administrator and have complete permissions in the code repository instance but be restricted to certain projects to be able to submit a code request against, as Change Captain permissions override any applicable function that would progress code forward.

Such functions can include, but are not limited to: restriction or block: upon submission of a code request, upon approval of a code request, when merging a code request, or branch targets; restrictions on the ability to release code; restrictions on the ability to tag code as ready for production or other applicable tagging mechanisms to indicate staging or production readiness; restrict or block deployments; dependencies on the existence of a relevant Change Captain ticket; dependencies on the existence of a relevant Change Captain ticket in the right status; and dependencies on the existence of a relevant Change Captain set of permissions for the project the ticket is assigned to at the time of function.

The SDCM module 111 may further integrate artificial intelligence (AI) and machine learning technologies to enhance the system's ability to identify potential issues as well as to automatically generate various forms of information presentations such as outlines, slides, graphs, and charts based on historical data captured by Change Captain either within the SDCM product or other Change Captain products, facilitating easy conversion of data into actionable information for executive decision making. This will transition change management and auditing from a reactive to a proactive approach, enabling auditors and organizations to anticipate issues and address them ahead of time.

The present invention may further implement gamification to help recognize users for their work. Various uses of the present invention may provide users with rewards such as badges, titles, medals, and more.

Additional reporting due to the unique, granular nature of the event driven architecture allows for automated reporting of capital expenditure that reduces tedious, imprecise manual collection.

As previously disclosed, in the contemplated embodiment the plurality of automation modules comprises a database change management (DBCM) module 113. The DBCM module 113 ensures and forces compliance to best practice DBCM flows, assuring that each step of the DBCM process is completed and in the correct order. The DBCM module 113 prevents database changes when paired and properly integrated with a client's database configuration, functioning as a preventative mechanism rather than a detective mechanism to offer a test of one for database change management audits so long as the DBCM module 113 has remained active consecutively once implemented.

The DBCM module 113 is novel in its integration mechanism when being implemented through the requirement of an API key, or other such persistent authentication mechanism, rather than the need for credentials for users on an individual basis. Upon implementation, the DBCM module 113 can prevent database changes, ensuring database changes are first properly documented and approved prior to the change being allowed to occur.

It is contemplated that the DBCM module 113 is designed to ensure proper change management procedures are followed when the database in question is a schema-less database architecture, or when data itself is being modified directly within the database. Database schema changes will be implemented instead through the previously described SDCM module 111.

The DBCM module 113 may enforce change management through a variety of approaches in different embodiments. The following is a general process flow in a first embodiment of the DBCM module 113, though it should be noted that some steps may be omitted, added, or otherwise changed as desired in other embodiments.

In the first embodiment, the DBCM module 113 automatically provisions a database engineer time-boxed write access to a database environment only after proper approval has been obtained within the system by means of a ticket approval process.

Figure 5A:
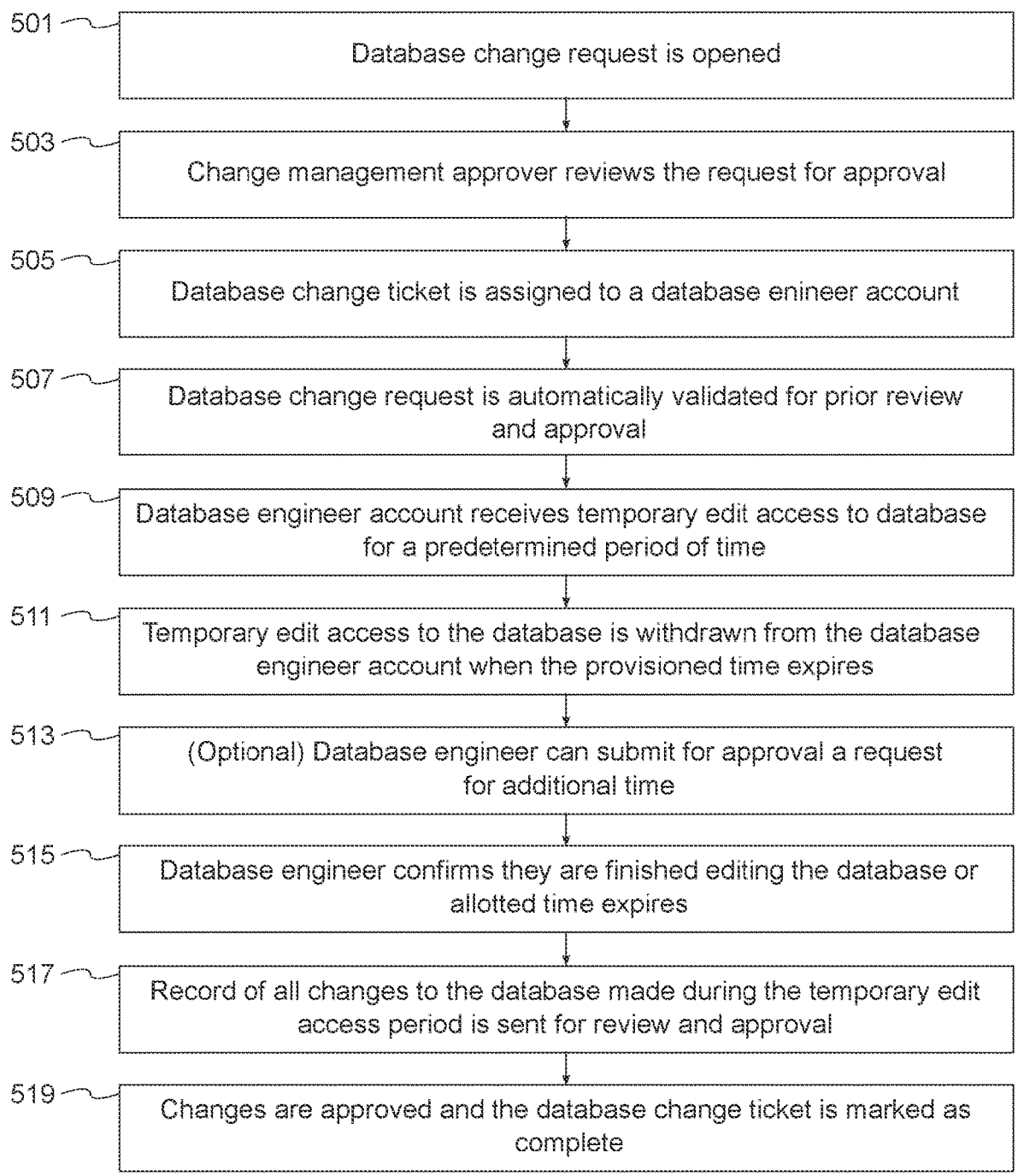
FIG. 5A depicts a first embodiment of a process flow for the DBCM module in a preferred embodiment of the present application.

As depicted in FIG. 5A, a database change request is opened 501, and a change management approver reviews the database change request and approves or denies the request 503. Upon approval of the database change request, a database change ticket is assigned to a database engineer account 505. Next, the DBCM module 113 automatically validates the database change request for prior review and approval 507 to authorize a database change to a database environment, wherein the prior review and approval corresponds to the change management approver review. Based on the validating, the database engineer account is granted temporary edit access to the database environment by the DBCM module 113 for a predetermined period of time 509, depending on the request. Changes made to the database environment by the database engineer account during the specified time period are recorded by the DBCM module 113. After expiration of the specified time period, the temporary write access is withdrawn 511 from the database engineer account by the DBCM module 113. A request for additional time can be sent for approval related to the change request 513. Once the database engineer confirms they are done with the request, or the allotted time has expired 515, a record of all changes to the database during the time the database engineer had access to the database will be sent to a management account for review and approval 517. The approval will ensure that all changes were appropriate and relate to the change request ticket. After approval, the database change ticket will be marked complete 519.

Figure 5B:
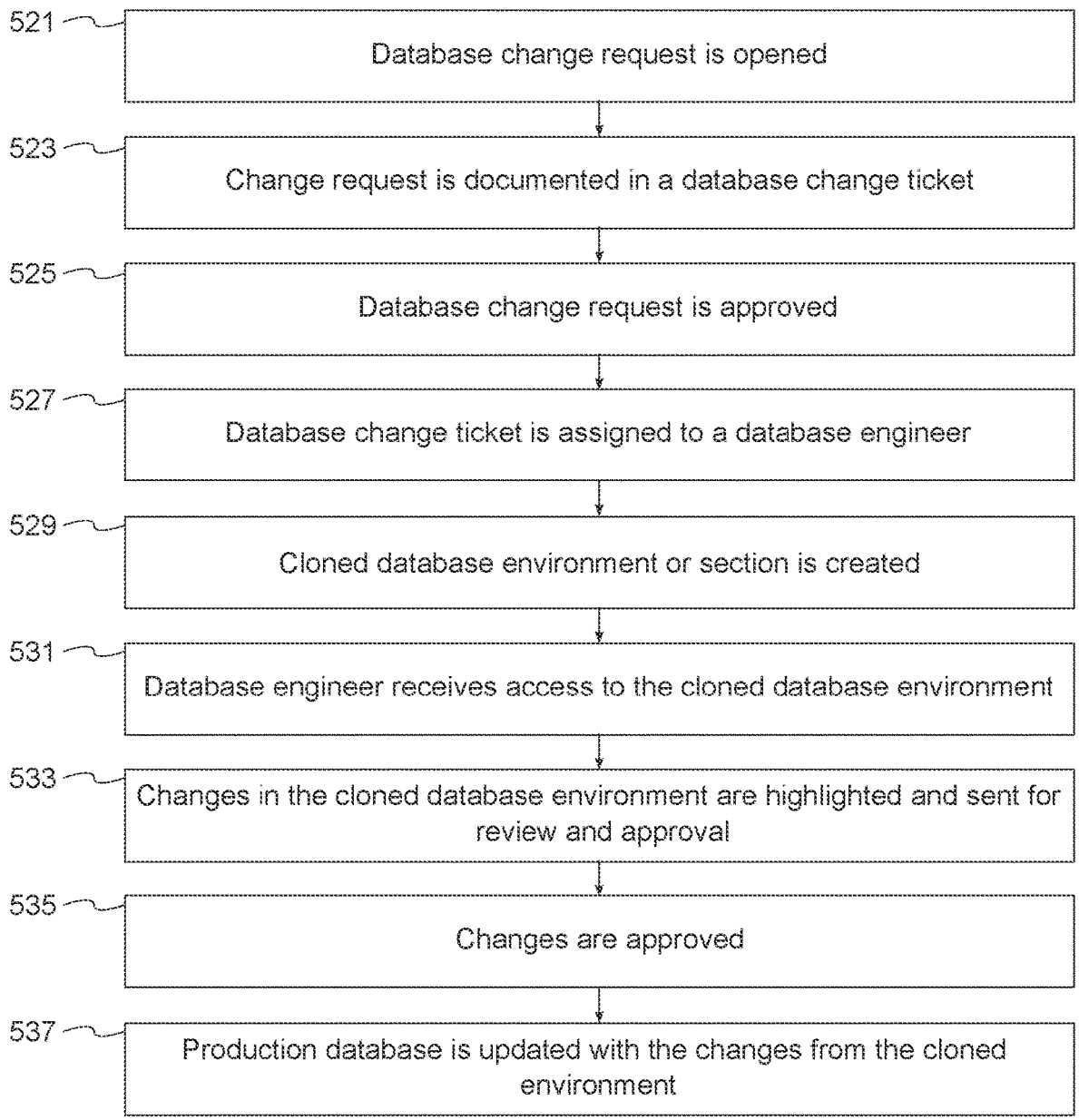
FIG. 5B depicts a second embodiment of a process flow for the DBCM module in a preferred embodiment of the present application.

In a second embodiment, depicted in FIG. 5B, after a change request is made 521, documented in a ticket 523, approved 525, and assigned to a database engineer 527, a cloned environment of the database or a cloned section of the database is created 529, depending on the requested change. The database engineer is provisioned access to the cloned database 531, where the database engineer is able to make all desired changes. Once complete, the cloned environment will be highlighted with all changes and modifications made by the database engineer and will be sent for review and approval 533. Only after approval has occurred 535 will the production database be updated with the modifications from the cloned environment 537.

In another embodiment, the DBCM module 113 is configured to: implement a versioning system for change management of a non-schema database; automatically verify a database change to a branch in the non-schema database for compliance with change management standards; and move the database change to a production queue, if the database change passes the change management check and is preventatively reviewed and approved.

As previously described for the SDCM module 111, the DBCM module 113 further integrates with the LACM module 109 to validate whether users can perform specific functions and appropriately block or approve the function, regardless of whether the user has the permissions.

The use of the DBCM module 113 allows both internal and external auditors to perform automated testing around the DBCM process, allowing testing of a single sample rather than hundreds of samples. Since every change must follow the same change process, if DBCM controls pass for one change, an auditor can confidently say they will pass for all changes. The DBCM module 113 of the present invention further helps reduce the risk of a database engineer accidentally or intentionally making an unauthorized change to the database environment.

The DBCM module 113 of the present invention ensures: every database change follows the same change management flow; segregation of all duties exists for all database changes; appropriate approvals are obtained before a change can progress in the database change flow; and that testing, review, and approval are performed related to the database change before the ticket can be marked complete.

As previously disclosed, in the contemplated embodiment the plurality of automation modules further comprises a software patch change management (SPCM) module 115, focusing on patches, upgrades and other changes to vendor or third-party software to ensure that all changes are approved and tested prior to being queued for production, and lastly tested in post-production validation to confirm the software patch is working as intended. The SPCM module 115 of the present invention ensures and forces compliance to best practice SPCM flows, assuring that each step of the SPCM process is completed and in the correct order.

The following is an exemplary patch change process flow in an embodiment of the present invention. It should be noted that the following is a generally recommended flow in some embodiments, but some steps may be omitted or otherwise changed as desired in other embodiments.

Figure 6:
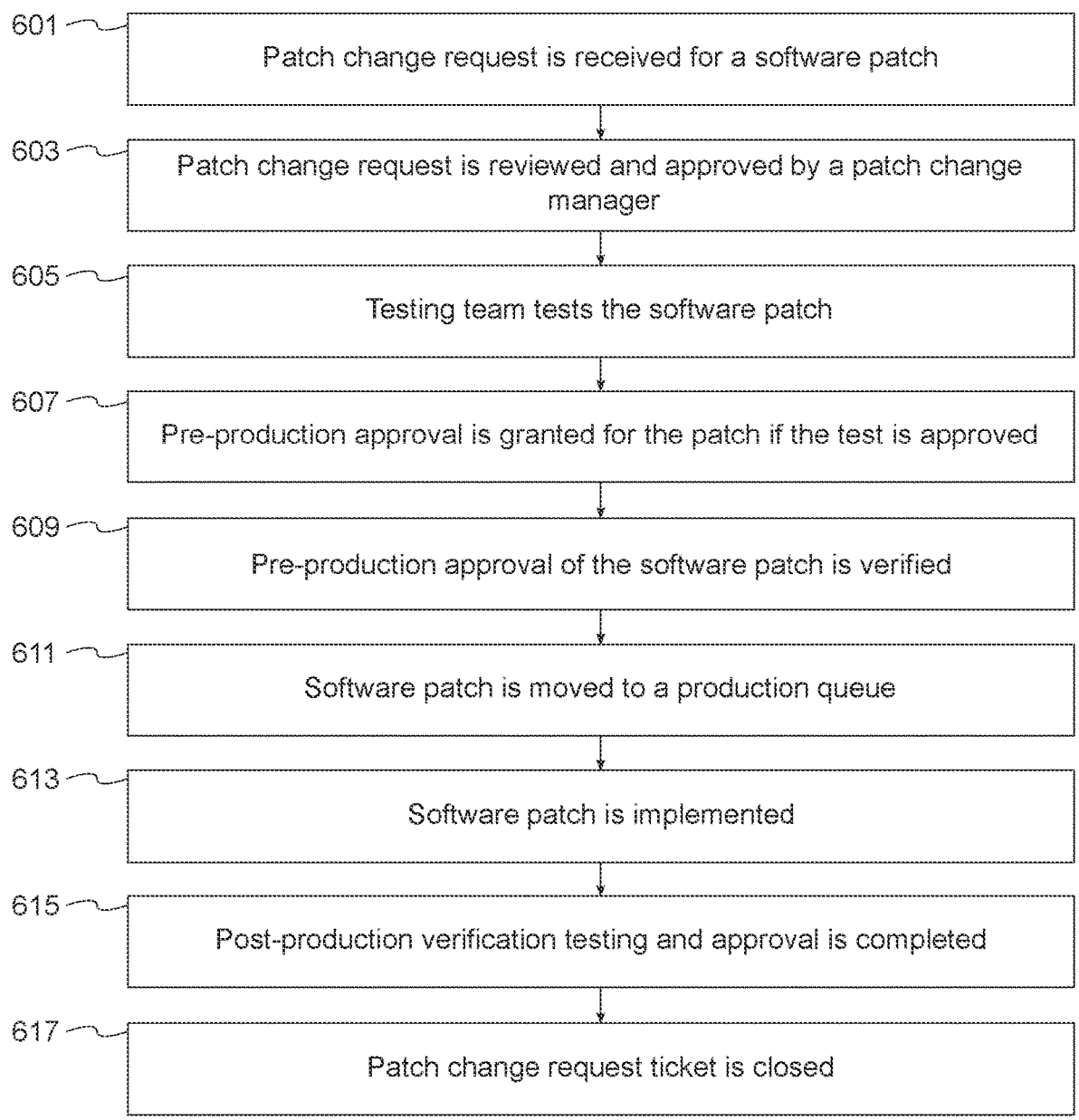
FIG. 6 depicts a process flow for the SPCM module in a preferred embodiment of the present application.

Referring to FIG. 6, first, a patch change request to implement a software patch is received 601 by the system, and the patch change request is reviewed and approved by a patch change manager 603. Next, a testing team tests the software patch 605, and pre-production approval is granted if the test is approved 607. The SPCM module 115 verifies the pre-production approval of the software patch 609 and automatically moves the software patch to a production queue 611. Next, the software patch is implemented 613, PPV testing and approval is completed 615, and finally the patch change request ticket is closed 617.

Further, in some embodiments, the SPCM module 115 is configured to verify completion of an implementation review and approval process for a software patch prior to installation on a production server. After being received by the present invention and designated for modification, the software change patch is locked into a non-modifiable state prior to the review and approval process. If the review and approval process is not verified to be completed for the patch, installation of the patch is blocked. If the review and approval process is verified to be completed for the patch, the SPCM is configured to release the patch for installation. Only if the patch has been confirmed as reviewed and approved, and if the patch is non-modifiable, having retained its non-modifiable state after being received by the present invention, the SPCM module 115 allows installation of the patch and the patch is pushed to production.

The use of the SPCM module 115 allows both internal and external auditors to perform automated testing around the SPCM process, allowing testing of a single sample rather than hundreds of samples. Since every change must follow the same change process, if SPCM controls pass for one change, an auditor can confidently say they will pass for all changes. The SPCM module 115 of the present invention further helps reduce the risk of bad patches being pushed into production.

The SPCM module 115 of the present invention ensures: every patch change follows the same change management flow; segregation of all duties exists for all patch changes; appropriate approvals are obtained before a change can progress in the patch change flow; and that testing, review, and approval are performed related to the patch change before the ticket can be marked complete.

The SPCM module 115 streamlines software patching by enforcing best practice compliance including, but not limited to, ensuring that: software patches are tested pre-implementation; software patches are approved by an appropriate individual after testing; software patches are tested post-implementation; software patches are approved by an appropriate individual post-implementation; and a zero-trust framework is implemented, that could be expanded to include locking of resources.

The SPCM functions as a SaaS with a potential client tool installed in the customer's environment. The SPCM module 115 leverages admin-level access on the production servers that the patches will be rolled out to enforce and ensure that the desired process flow is properly completed and documented first before allowing the patch to be installed on the production server. Only after the above implementation steps are completed will the patch file be released from quarantine, allowing IT Admins to proceed with patch installation of the file that was previously tested and held in a quarantine state to ensure the patch is not modified after approval. Similarly, only after proper post-implementation testing, review, and approval by appropriate parties will the SPCM module 115 allow the patch change management ticket to be marked complete, closing the ticket. The SPCM module 115's admin-level account will block any software patching or installation failing to follow the above process, providing assurance that all installations are following best practices.

As previously disclosed, in the contemplated embodiment the plurality of automation modules further comprises a key report change management (KRCM) module 117. Key reports are reports used to make critical financial, strategic, or other major decisions and need to be strictly managed to protect the best interests of all parties. Key reports are typically composed of a schema and a data source, such as a data lake, from which data is pulled and fed through the schema before being sent to relevant parties. To protect the integrity of the report, modifications to the schema need to be restricted.

The present invention ensures and forces compliance to best practices for KRCM, ensuring that each step of the KRCM process is completed fully and in the correct order. The KRCM module 117 of the present invention, acting as a SaaS, prevents unauthorized changes surrounding key reports based out of data lakes operating according to a zero-trust network model. This aspect of the present invention allows for increased assurance in data integrity and form immutability with traceable change management. Integrating with the data lake environment(s) of the client's choosing, Change Captain will lock down the data within the data lake to prevent manipulation of the data lake, ensuring a source of truth. Instead, organizations will be able to manipulate a subset of the data from the data lake in a mirrored environment, or using other relevant change management means, to ensure the source data lake is never compromised.

The KRCM module 117 of the present invention also ensures that once a key report is created, modification of this report is properly locked down to ensure proper change management occurs before the report can be manipulated to avoid misinterpretation of a key report. The KRCM module 117 will also maintain an immutable audit record of all changes and approvals to key reports, giving readers assurance of the key report they are viewing.

In some embodiments, the present invention will automatically provision time-boxed key report edit access, only after a proper approval has been obtained within the system. The following is an exemplary key report change process flow using the present invention. It should be noted that the following is a generally recommended flow in some embodiments, but some steps may be omitted or otherwise changed as desired in other embodiments.

Figure 7A:
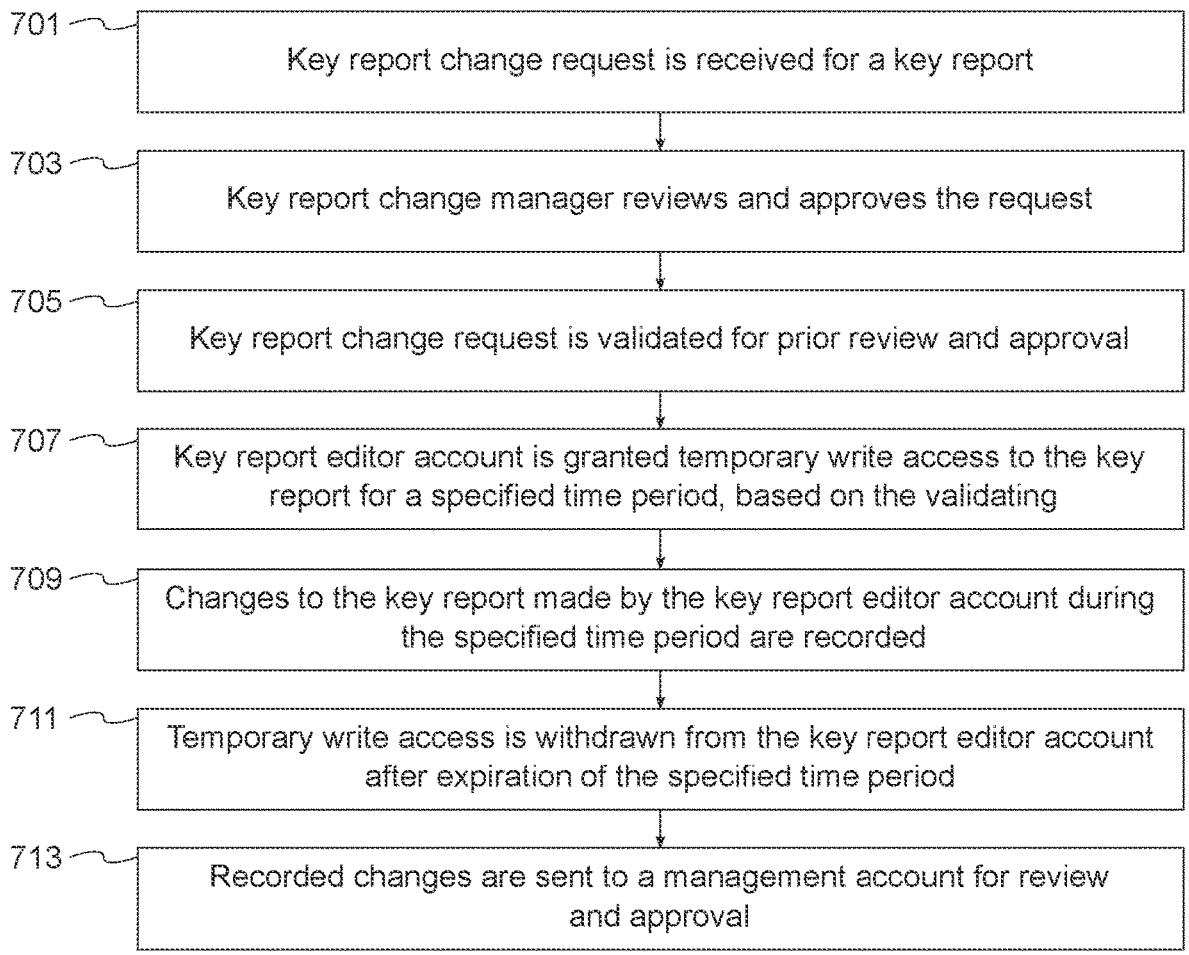
FIG. 7A depicts a first embodiment of a process flow for the KRCM module in a preferred embodiment of the present application.

First, referring to FIG. 7A, a key report change request is received by the system 701, and a key report change manager reviews and approves the request 703. Next, the KRCM module 117 automatically validates the key report change request for prior review and approval 705. Based on the validating, a key report editor account is granted temporary write access to the key report by the KRCM module 117 for a specified time period 707. Changes made to the key report by the key report editor account are recorded by the KRCM module 117 during the specified time period 709. After expiration of the specified time period, the temporary write access is withdrawn 711 from the key report editor account by the KRCM module 117. Finally, the recorded changes are sent to a management account for review and approval 713.

Figure 7B:
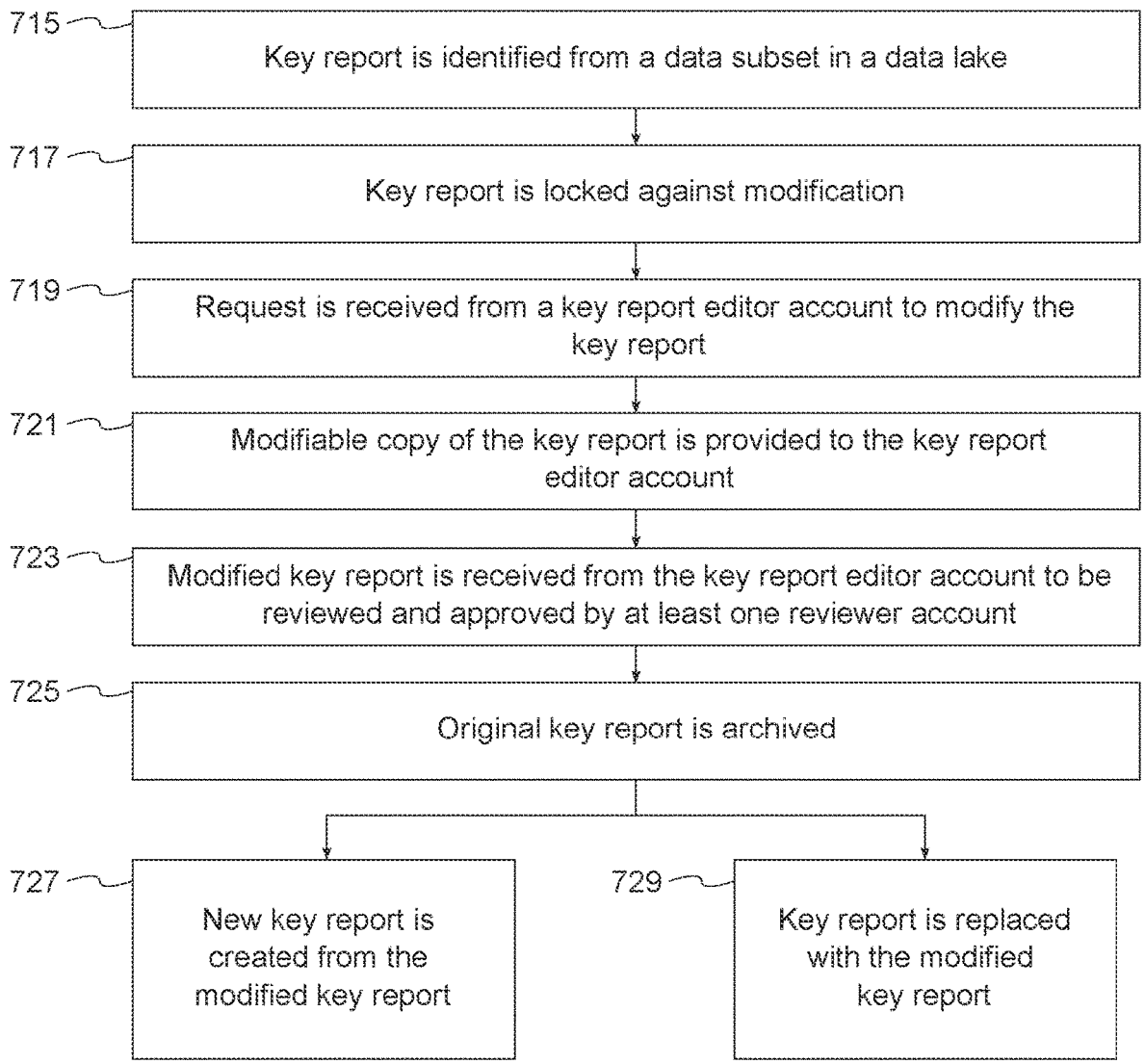
FIG. 7B depicts a second embodiment of a process flow for the KRCM module in a preferred embodiment of the present application.

Alternatively, in some embodiments, as mentioned, a mirrored environment approach is utilized. In such embodiments, as depicted in FIG. 7B, the KRCM module 117 is configured to: identify 715 and lock 717 a key report created from a data subset in a data lake; receive a request from a key report editor account to modify the key report 719; provide, to the key report editor account, a modifiable copy of the key report 721; receive, from the key report editor account, a modified key report to be reviewed and approved by at least one reviewer account 723; archive the original key report 725, and either: create a new key report from the modified key report 727, or: replace the key report with the modified key report 729, if the modified key report is designated as approved by the at least one reviewer account.

The use of the KRCM module 117 allows both internal and external auditors to perform automated testing around the KRCM process, allowing testing of a single sample rather than hundreds of samples. Since every change must follow the same change process, if KRCM controls pass for one change, an auditor can confidently say they will pass for all changes. The KRCM module 117 of the present invention further helps reduce the risk of unauthorized key report changes being made accidentally or intentionally.

The KRCM module 117 of the present invention ensures: every key report change follows the same change management flow; segregation of all duties exists for all key report changes; appropriate approvals are obtained before a change can progress in the key report change flow; and that testing, review, and approval are performed related to the key report change before the ticket can be marked complete.

As previously disclosed, in the contemplated embodiment the plurality of automation modules further comprises a data lake change management (DLCM) module 119. The present invention ensures and forces compliance to best practices for DLCM, ensuring that each step of the DLCM process is completed fully and in the correct order. In some embodiments, the present invention will automatically provision time-boxed data lake edit access, only after a proper approval has been obtained within the system.

Figure 8:
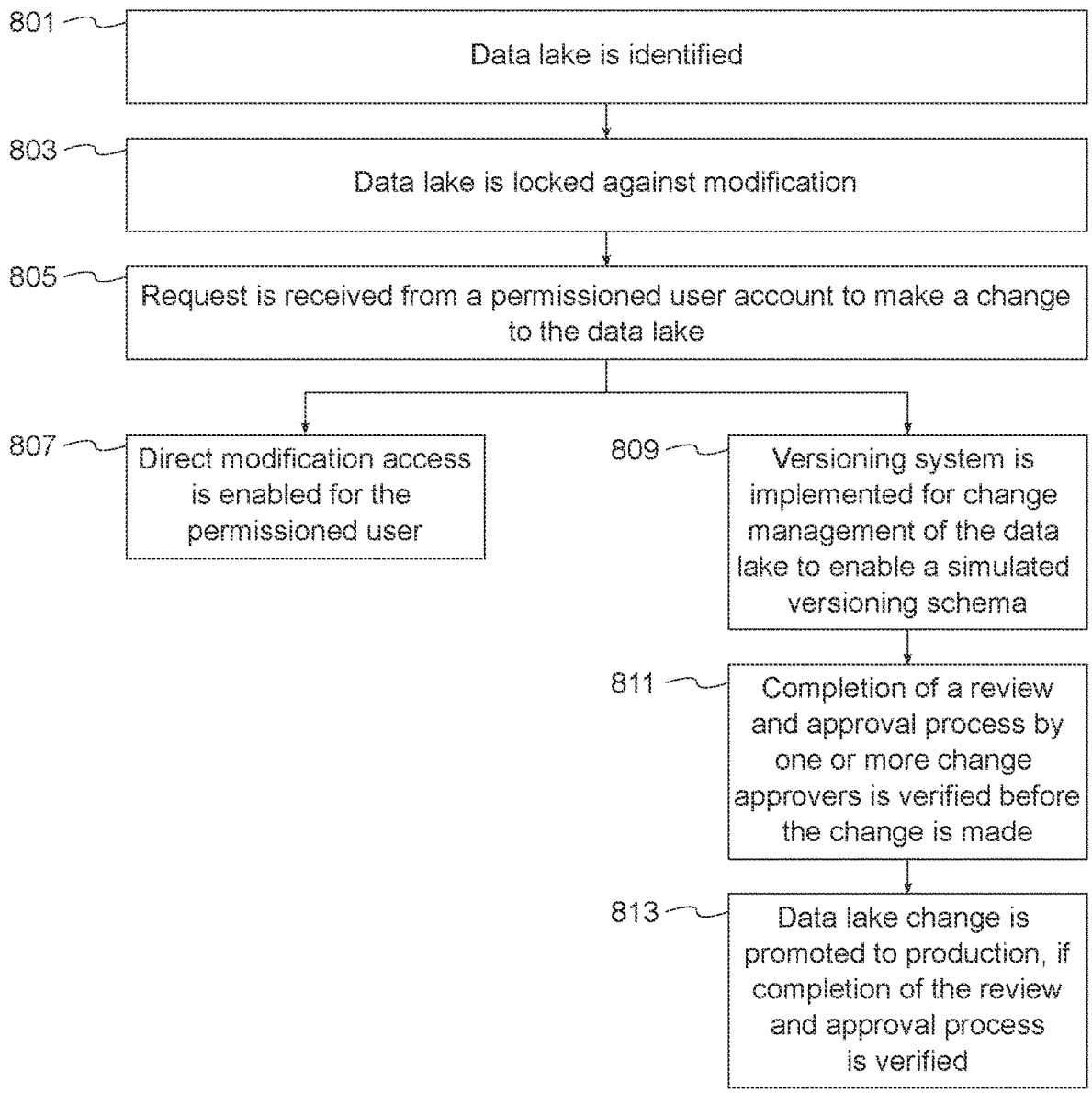
FIG. 8 depicts a process flow for the DLCM module in a preferred embodiment of the present application.

Referring to FIG. 8, in the contemplated embodiment, the DLCM module 119 is configured to comprise a ticketing module to allow for review and approval of changes to data lakes, enabling preventative change management while following segregation of duties. The DLCM module 119 is further configured to: identify 801 and lock a data lake into a non-modifiable state 803; receive a request from a permissioned user account to make a change to the data lake 805; either: enable, for the permissioned user, direct modification access to the data lake 807, or: implement a versioning system for change management of the data lake to enable a simulated versioning schema 809; verify completion of a review and approval process by one or more change approvers prior to the change being made 811; and promote the data lake change to production, if completion of the review and approval process is verified 813.

The use of the DLCM module 119 allows both internal and external auditors to perform automated testing around the DLCM process, allowing testing of a single sample rather than hundreds of samples. Since every change must follow the same change process, if DLCM controls pass for one change, an auditor can confidently say they will pass for all changes. The DLCM module 119 of the present invention further helps reduce the risk of unauthorized key report changes being made accidentally or intentionally.

The DLCM module 119 of the present invention ensures: every data lake change follows the same change management flow; segregation of all duties exists for all data lake changes; appropriate approvals are obtained before a change can progress in the data lake change flow; and that testing, review, and approval are performed related to the data lake change before the ticket can be marked complete.

As previously disclosed, in the contemplated embodiment the plurality of automation modules 107 further comprises a (controlled) document version change management (DVCM) module 121, ensuring only appropriately permissioned individuals have access to key documents and if any updates or changes are needed, versioning controls are implemented.

The following is an exemplary general DVCM process flow using an embodiment of the present invention. It should be noted that the following is a generally recommended flow in some embodiments, but some steps may be omitted or otherwise changed as desired in other embodiments.

Figure 9:
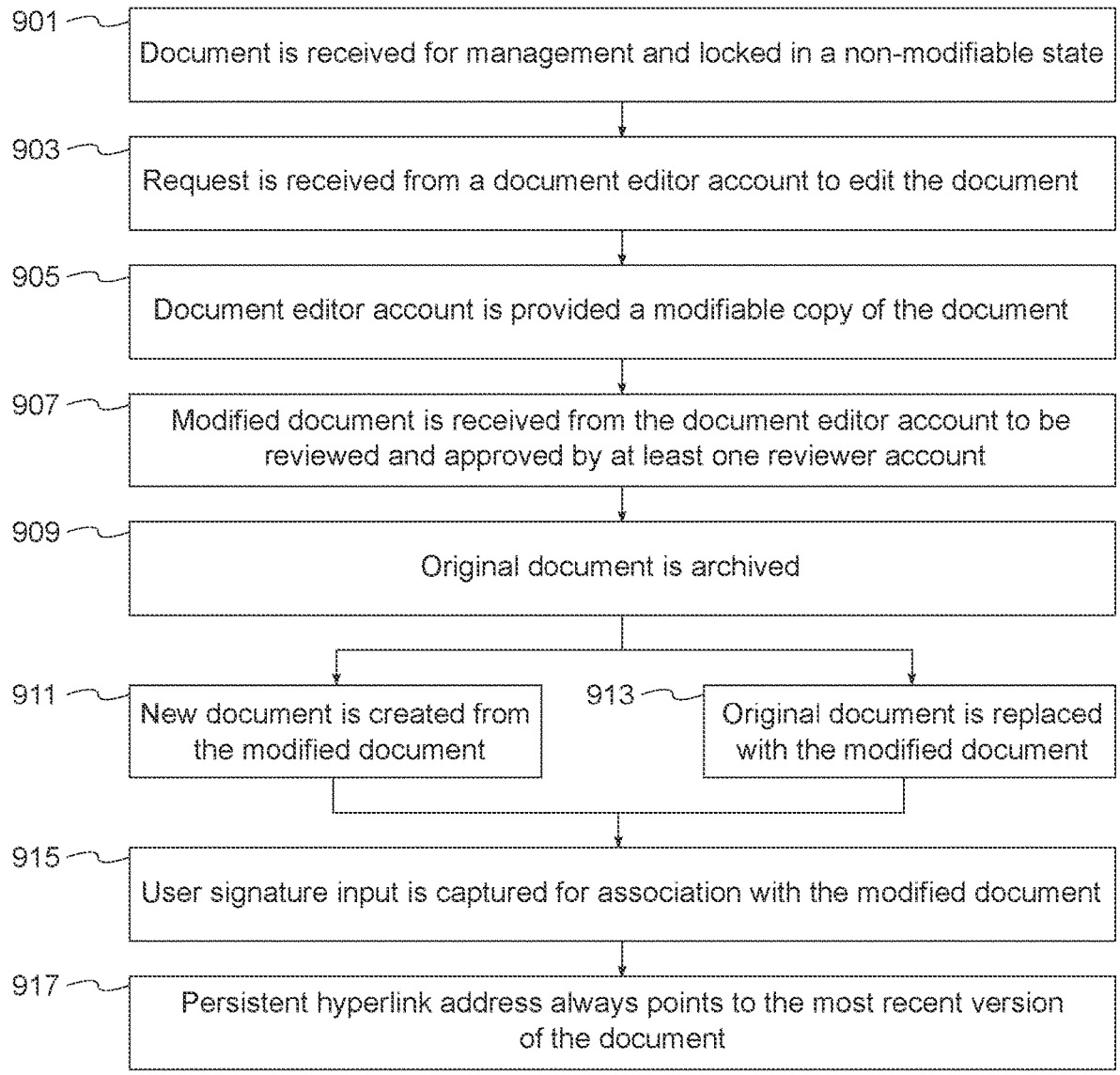
FIG. 9 depicts a process flow for the DVCM module in a preferred embodiment of the present application.

Referring to FIG. 9, in the contemplated embodiment, the DVCM module 121 is configured to: receive a document for management and lock the document in a non-modifiable state 901; receive a request from a document editor account to edit the document 903; provide, to the document editor account, a modifiable copy of the document 905; receive, from the document editor account, a modified document to be reviewed and approved by at least one reviewer account 907; archive the original document 909; create a new document from the modified document 911, or replace the document with the modified document 913, if the modified document is designated as approved by the at least one reviewer account; assign one or more work tasks to a user; capture a user signature input for association with the new document 915—which may be required each time the document is edited and a new document version is produced; and create and maintain a persistent hyperlink address which always points to a most recently approved version of the document 917.

The use of the DVCM module 121 allows both internal and external auditors to perform automated testing around the document versioning change process, allowing testing of a single sample rather than hundreds of samples. Since every change must follow the same change process, if document versioning change management controls pass for one change, an auditor can confidently say they will pass for all changes. The DVCM module 121 of the present invention further helps reduce the risk of unauthorized document versioning changes being accidentally or intentionally made.

The DVCM module 121 of the present invention ensures: every document version change follows the same change management flow; segregation of all duties exists for all document version changes; appropriate approvals are obtained before a user is granted edit access to a duplicate version; and that review and approval are performed related to the document version change before the ticket can be marked complete.

The DVCM module 121 of the present invention allows users to lock files for editing, thereby requiring appropriate review and approval of any proposed modifications made to the file before replacing the source of truth document and archiving the then-current version of the original file. The DVCM module 121 places preventative controls around an organization's most important documents to ensure any change to said documents is documents, reviewed, and approved before the change can be implemented, ensuring strict change management controls around the files. The DVCM module 121 of the present invention also allows the creation of new documents that are either new, or a tangential reference to a different document set wherein all module aspects apply in full with regard to segregation of duties, approvals, and review prior to the document being considered done.

The contemplated embodiment of the present invention functions wherein client organizations retain access to owner accounts of major services like repositories, thereby allowing a client to entirely circumvent the controls and processes of the present invention should the need arise; for example, if the at least one remote server 103, or other services or entities responsible for operating the present invention should experience a service outage and go offline. In effect, the use of the one or more owner accounts to which the client retains access restores an environment to a similar state of controls that existed prior to implementation of the embodied invention environment. The master administration account allows the organization to push code to a production queue, edit database environments, edit key reports, and edit data lakes as if the system of the present invention was absent, but does not allow an organization to make document version changes in the event of an outage as that capability relies on an available Change Captain environment. The system will automatically make note of the outage and if the owner account was used in order to properly inform auditors of any manual testing around the outage window which may be called for. The system will automatically make note and create an event log of all uses of the owner account(s) that may be relevant to a client to automatically report and properly inform auditors of any manual testing around the usage window(s) that may be called for.

Figure 10:
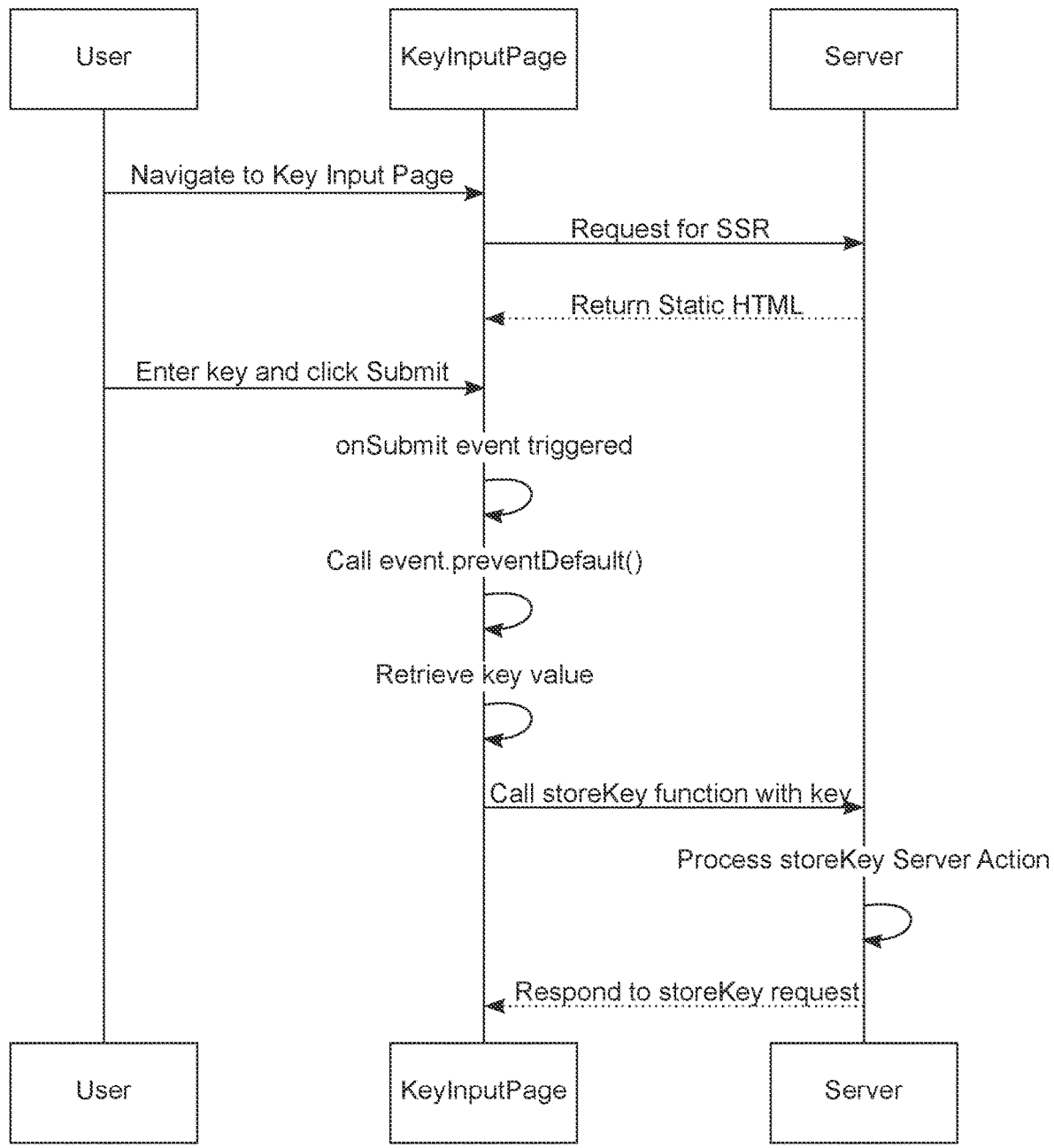
FIG. 10 depicts an exemplary messaging process implemented by the CTK system in a preferred embodiment of the present application.

As previously disclosed, in the contemplated embodiment, the present invention further implements multiple advanced security features, one such feature being a novel system, "Collect the Key" or "CTK" 123, for secure API key storage and management. The CTK system 123 of the present invention is configured to securely collect, store, and manage API keys by isolating them within a private network. FIG. 10 depicts an exemplary messaging process implemented by the CTK system 123.

The CTK system 123 is a system architecture designed to securely store API keys. In the contemplated embodiment, the CTK system 123 integrates numerous technologies, using a zero-trust network access (ZTNA) approach, peer-to-peer (P2P) connectivity using Quick UDP Internet Connections (QUIC) on top of User Datagram Protocol, quantum-resistant cryptographic keys, server-side UI rendering, and server-initiated form submission, eliminating the need for client-side JavaScript. The CTK system 123 further includes RPC for client/server communication and resource protection with least privilege access control. The CTK system 123 further implements universal MFA, mitigates lateral network traffic, and minimizes cyberattack surface. A distinctive feature of the CTK system 123 is the secure isolation of user-provided API keys within a private network, which is impervious to both physical and logical external public access, thereby ensuring regulatory compliance and/or best practice compliance.

Figure 11:
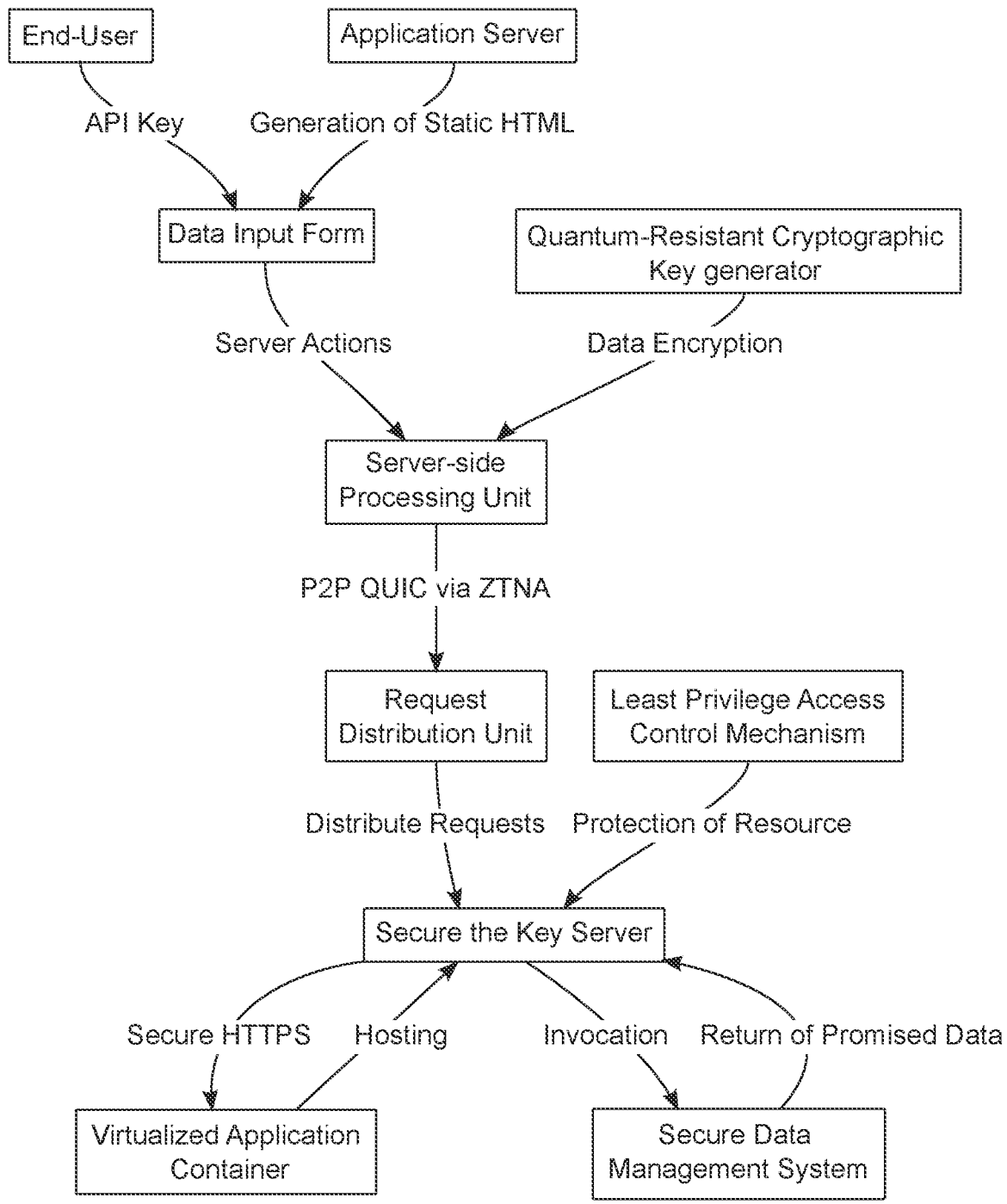
FIG. 11 depicts a high-level abstract component view of the CTK system and the STK system and their process flows in a preferred embodiment of the present application.
Figure 12:
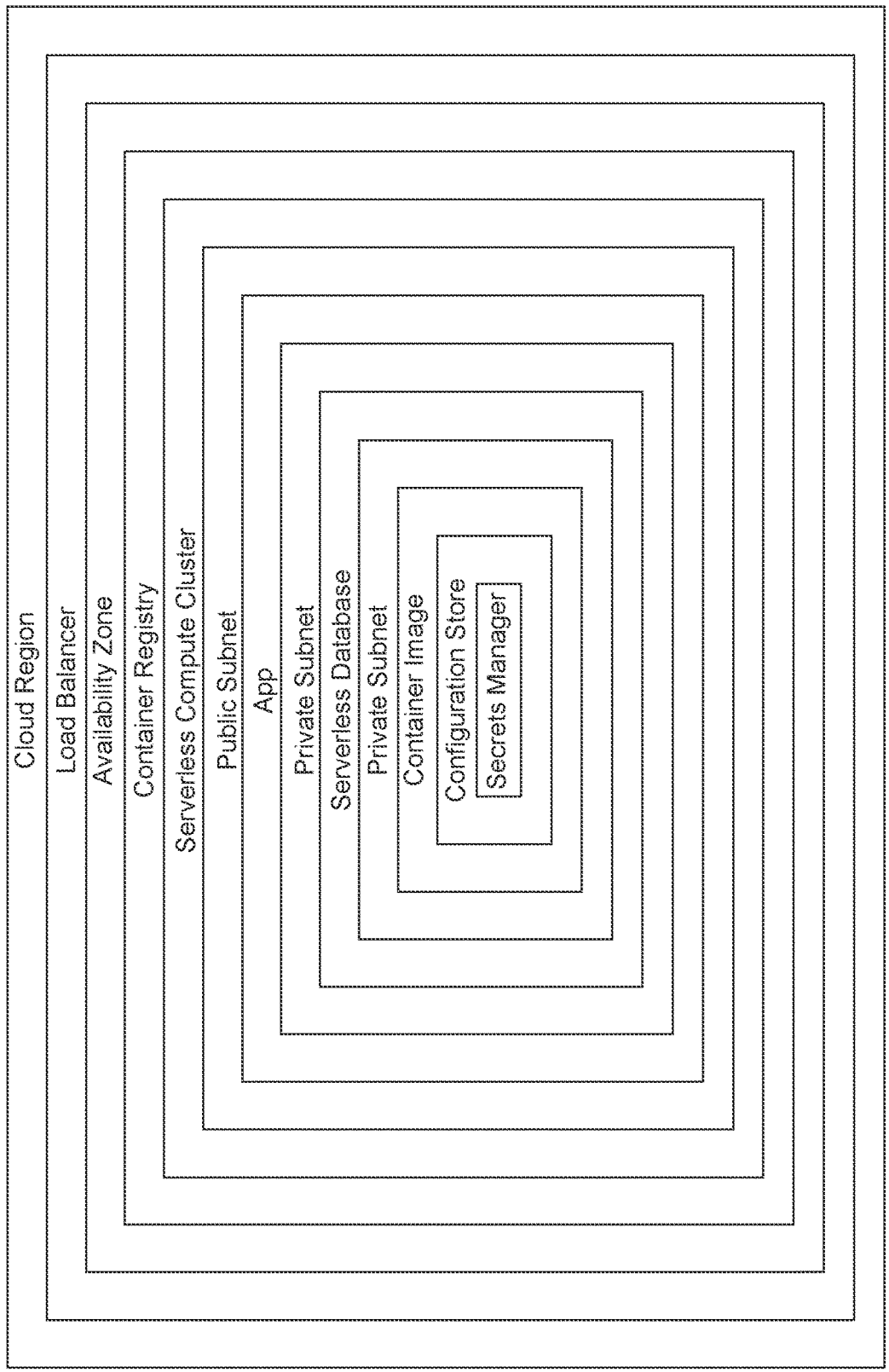
FIG. 12 depicts a high-level abstracted view of security layers implemented by the STK system in a preferred embodiment of the present application.
Figure 13:
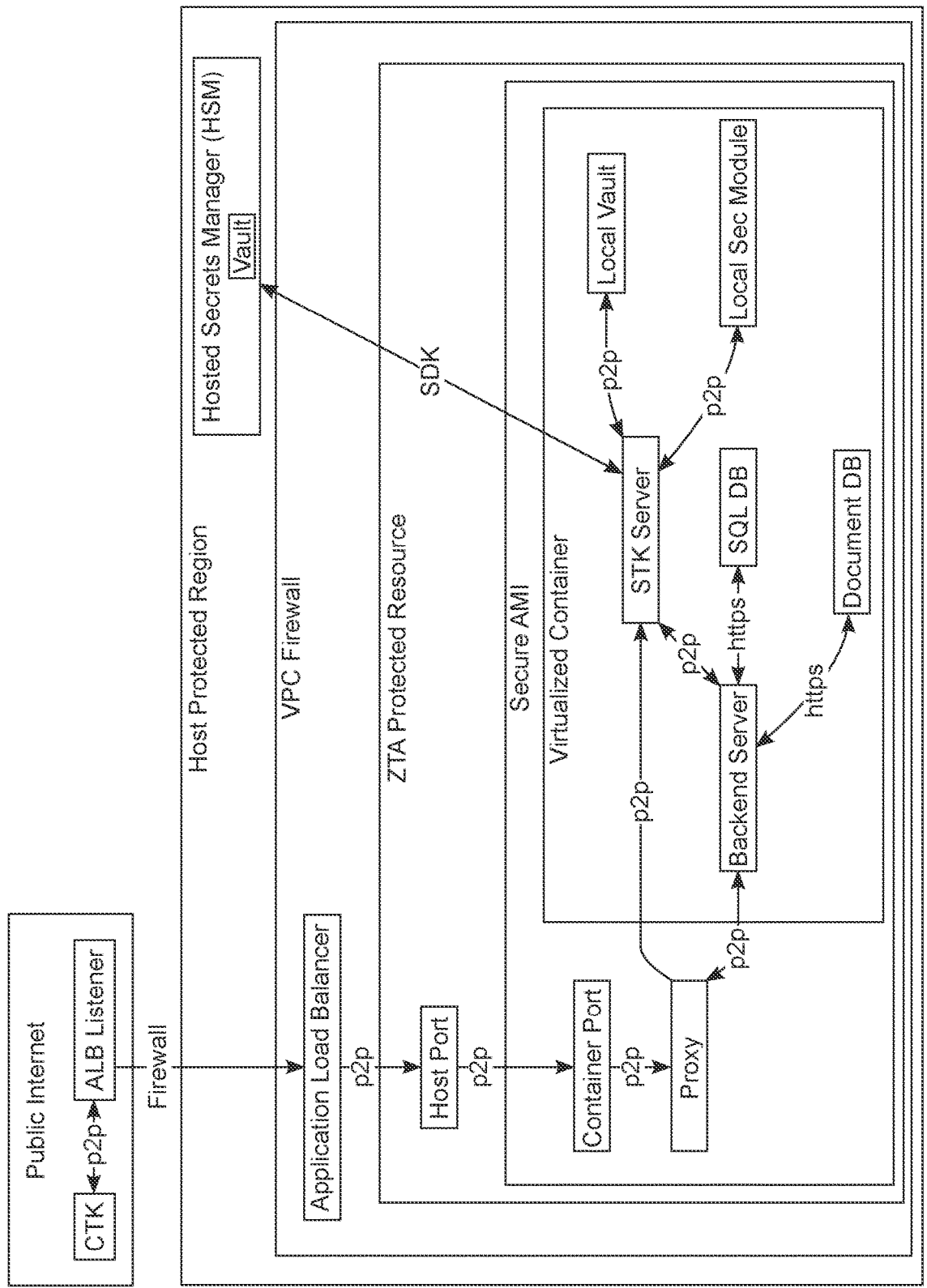
FIG. 13 depicts an exemplary system architecture for the cloud provider-agnostic STK system in a preferred embodiment of the present application.

Another of the advanced security features incorporated in the contemplated embodiment may be referred to as "Secure the Key", or "STK" 125, or alternatively, "NestedNet." FIG. 11 depicts a high-level abstract component view of the CTK system 123 and the STK system 125 and how they flow. FIG. 12 depicts a high-level abstracted view of security layers implemented by the STK system 125. The STK system 125 incorporates a cloud-agnostic secure nested network architecture encapsulating a secure inner network within an outer network through a single virtualized container, depicted in FIG. 13. The cloud-agnostic secure nested network architecture also incorporates a zero-trust network access model, ephemeral databases, and an artificial intelligence (AI) model trained to identify and proactively counter security breaches. The network architecture further incorporates a progressive framework, facilitating the creation of functional, independent modules, such that the network architecture is modular.

The STK system 125 encapsulates a secure network within a larger network through the employment of a single virtualized container. The container is designed to function as a comprehensive, self-sufficient Infrastructure as a Service (IaaS) system, reflecting the "nested" design of the architecture. The STK system 125 further incorporates a ZTNA model and exhibits cloud-agnostic properties, allowing for smooth operation across diverse cloud environments. Inside the architecture, the STK system 125 integrates internal SQL and document databases which are ephemeral, containing initial configuration settings, system-specific data, and encrypted secrets required for runtime operations.

The creation of independent functional modules through the STK system 125 ensures that a failure in one functional component does not adversely impact other parts of the server, enhancing system resilience and reliability. The modularity also provides versatility, adaptability, and plug-and-play functionality, allowing specific modules to be activated or deactivated according to scaling requirements to enhance system performance and cost-effectiveness.

Key aspects of the STK system 125 are the encapsulation of a comprehensive Infrastructure as a Service (IaaS) system within a single virtualized container, the architecture of a secure network within a larger network, the execution of a Zero Trust Network Access model, the cloud-agnostic disposition of the system, the integration of ephemeral databases, and the deployment of a specialized model for intrusion detection that is finely tuned to the system's unique architecture, in addition to the effective management, deployment, and scaling of network resources via independent, functional modules.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A system for automating change management tasks comprising:
   at least one remote server communicably coupled with a communication network and managing a plurality of automation modules, the plurality of automation modules comprising:
      a logical access change management (LACM) module configured to automate validation of user access permissions;
      a software development change management (SDCM) module configured to automate testing of changes made to a software system;
      a database change management (DBCM) module configured to automate testing of changes made to a database comprising:
         automatically validating a database change request for prior review and approval to authorize a database change to a database environment;
         granting, to a database engineer account, temporary write access to the database environment for a specified time period, based on the validating;
         recording changes made to the database environment by the database engineer account during the specified time period;
         withdrawing the temporary write access from the database engineer account, after expiration of the specified time Period; and
         sending the recorded changes to a management account for review and approval;
      a software patch change management (SPCM) module configured to automate testing of patches made to third-party software;
      a key report change management (KRCM) module configured to automate version management of key reports;
      a data lake change management (DLCM) module configured to automate change management of data lakes; and
      a document version change management (DVCM) module configured to automate document versioning;
   wherein each of the automation modules ensures every change follows a preventative standardized change management process including acquisition of approval prior to the change being made, functionally integrated segregation of duties, and advanced reporting functionality.

2. The system of claim 1, wherein the LACM module is configured to:
   receive an access request to grant, to one or more parties, change access to a changeable entity managed by the LACM;
   create a new access ticket based on the request, wherein the access request ticket is required to be reviewed and approved by one or more access grantors;
   grant, to the one or more parties, change access to the changeable entity, when approval of the access request is received from the one or more access grantors following segregation of duties; and
   generate automatic reminders to help promote best practices on logical access reviews on a policy dependent basis wherein access may then be reviewed and approved for compliance use cases and approved for ongoing compliance use cases to ensure access remains appropriate or needs correction.

3. The system of claim 1, wherein the LACM module is configured to act as a standalone software-as-a-service (SaaS) system configured to integrate with and provision user access permissions for client systems.

4. The system of claim 1, wherein the LACM module is configured to synchronize user permissions between the LACM module and an active directory environment of a client system.

5. The system of claim 4, wherein a zero-trust network access model is used to communicate with the client systems.

6. The system of claim 1, wherein the SDCM module is paired and integrated with a code repository associated with the software system, and configured to:
   automatically check a code change to a software for change management compliance, and move the code change to a production queue, when the code change passes the change management compliance check.

7. The system of claim 6, wherein the SDCM module is configured to implement one or more phase gates based on compliance factors in a software production pipeline, wherein the SDCM module blocks merging of the code change into a production branch of the pipeline until each a plurality of development prerequisites are satisfied, and wherein the prerequisites correspond to the compliance factors.

8. The system of claim 6, wherein the SDCM module is linked with at least one integration tool configured to minimize context switching during routine use and enable, outside the context of the SDCM module, collection of information necessary to ensure compliance.

9. The system of claim 6, wherein the SDCM module is configured to activate proactive prevention measures based on automated tracking and analysis of native events from one or more systems managed by the SDCM module.

10. The system of claim 1, wherein the DBCM module is configured to:
    implement a versioning system for change management of a non-schema database;
    automatically verify a database change to a branch in the non-schema database for compliance with change management standards; and
    enable moving of the database change to a production queue, when the database change passes the change management compliance check and is preventatively reviewed and approved.

11. The system of claim 1, wherein the SPCM module is configured to:
    verify completion of an implementation review and approval process for a software patch prior to installation on a production server, wherein the software patch is locked into a non-modifiable state prior to the review and approval process;
    block installation of the patch, when the review and approval process is not verified to be completed for the patch;
    release the patch for installation, when the review and approval process is verified to be completed for the patch; and
    allow installation of the patch, only when the patch has been reviewed and approved and is non-modifiable.

12. The system of claim 1, wherein the KRCM module is configured to:
    identify and lock a key report created from a data subset in a data lake;
    receive a request from a key report editor account to modify the key report;
    provide, to the key report editor account, a modifiable copy of the key report;
    receive, from the key report editor account, a new key report or a modified key report to be reviewed and approved by at least one reviewer account;
    accept the new report, archive the key report; and
    create a new key report from the modified key report, or replace the key report with the modified key report, when the modified key report is designated as approved by the at least one reviewer account.

13. The system of claim 1, wherein the DLCM module is configured to:
    comprise a ticketing module to allow for review and approval of changes to data lakes, enabling preventative change management while following segregation of duties;
    identify and lock a data lake into a non-modifiable state;
    receive a request from a permissioned user to make a change to the data lake;
    either:
       enable, for the permissioned user, direct modification access to the data lake, or:
       implement a versioning system for change management of the data lake to enable a simulated versioning schema;
    verify completion of a review and approval process by one or more change approvers prior to the change being made; and
    allow promotion of the change to production, when completion of the review and approval process is verified.

14. The system of claim 1, wherein the DVCM module is configured to:
    receive a document for management and lock the document;
    receive a request from a document editor account to edit the document;
    provide, to the document editor account, a modifiable copy of the document;
    receive, from the document editor account, a modified document to be reviewed and approved by at least one reviewer account;
    archive the document;
    create a new document from the modified document, or replace the document with the modified document, when the modified document is designated as approved by the at least one reviewer account;
    assign one or more work tasks to a user;
    capture a user signature input for association with the new document; and
    create and maintain a persistent hyperlink address pointing to a most recently approved version of a document.

15. The system of claim 1, configured to securely collect, store and manage API keys by isolating them within a private network.

16. The system of claim 15, incorporating a zero-trust network access model, quantum-resistant cryptographic keys, server-side rendering, server-based form submissions, Remote Procedure Call (RPC)-based client/server communication, fine-tuned least privilege access control, lateral network traffic prevention, cyberattack surface reduction, Universal MFA implementation, and the isolated usage of the API key in a private server post-user submission, wherein said incorporated features contribute to regulatory compliance and/or best practice compliance.

17. The system of claim 1, incorporating a cloud-agnostic secure nested network architecture encapsulating a secure inner network within an outer network through a single virtualized container.

18. The system of claim 17, incorporating a zero-trust network access model, ephemeral databases, and an artificial intelligence (AI) model trained to identify and proactively counter security breaches.

19. The system of claim 17, wherein the network architecture incorporates a progressive framework, facilitating the creation of functional, independent modules, such that the network architecture is modular.

* * * * *